Figure 1:
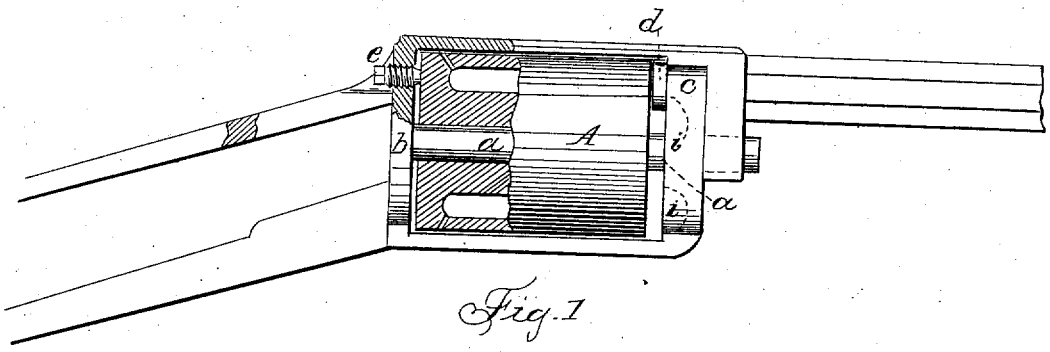
Figure 2:
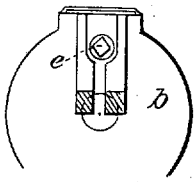
Figure 3:
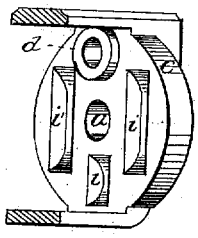

J. WARNER.

Revolver.

No. 2,223. Reissued Apr. 10, 1866.

N. PETERS, PHOTO-LITHOGRAPHER, WASHINGTON, D. C.

UNITED STATES PATENT OFFICE.

J. J. GREENOUGH, OF NEW YORK, N. Y., ASSIGNEE OF JAMES WARNER.

IMPROVEMENT IN REVOLVING FIRE-ARMS.

Specification forming part of Letters Patent No. 15,202, dated June 24, 1856; Reissue No. 2,223, dated April 10, 1866.

*To all whom it may concern:*

Be it known that JAMES WARNER, of Springfield, in the county of Hampden and State of Massachusetts, did invent certain new and useful Improvements in Fire-Arms, which were patented to him on the 24th day of June, 1856, on a specification and claims that were somewhat defective, and therefore the following has been substituted therefor; and I do hereby declare and ascertain the invention of said WARNER, as follows, reference being made to the annexed drawings, forming a part of this specification, in which similar letters indicate similar parts, and in which—

Figure I is a view of the revolving breech, partly in section. Fig. II is an end view of the back or recoil plate of the breech-frame. Fig. III is a perspective view of the battery-plate or safety-guard.

The improvements consist of the two following elements, either of which can be used with the omission of the other. First, the battery-plate *c*, formed so as to cover the openings or chambers in the revolving breech in front, the revolving breech being of the usual construction, and shown at A, and revolving upon a stationary pin, *a*, as an axis. There are recesses *i i'* in this battery-plate on the face toward the breech A, as clearly seen in Fig. III, and also a projection, *d*, which surrounds the opening that leads to the barrel. The face of this projection *d* is made to fit the end of the revolving breech closely, and against which it is kept closely in contact by a projection or pin standing out from the face of the recoil-plate, which is shown at *e*, Fig. I, where it will be seen represented as a screw that can be set up to adjust the revolving breech, with the rim *d* on the shield-plate. This pin or projection on the recoil or shield plate is placed on a line with the center of the bore of the barrel, and sustains the recoil of the revolving breech, that thus rests its solid end that forms the rear end of the chamber and receives the recoiling force of the charge contained therein against a rear support exactly in line with the force of the charge in discharging the arm, by which the recoil of the revolving breech is received upon a point placed in the direct line of the fire, and not upon the general surface of the shield-plate forming the back frame, nor upon the spindle upon which the breech rotates, as in the old mode. It is obvious this will be equally effected whether the projection or pin *e* be adjustable or stationary; but I prefer to make it adjustable, as in the drawings. In either case the pin is held stationary after it is adjusted.

The recesses *i i'* opposite the mouths of the chambers of the revolving breech are of a capacity equal the metal in the ball, and of such a shape as to insure holding it when driven into it by the discharge by accident of the charge in a chamber not opposite the barrel. The number of these cavities or recesses *i* may be equal to the number of chambers in the revolving breech, less one, which is opposite the projection *d* in rear of the barrel; or, as shown in the figure, one cavity may embrace two or more chambers. These cavities *i i'* are either straight-sided or beveled, but it is essential that the shape be such as to act on the principle of a wedge, the cavities being not only intended to receive the lead in case of accidental discharge of the side or bottom chambers, but in consequence of the flat or wedging sides of the cavities the lead becomes firmly jammed and compacted therein.

I am aware that a battery-plate both flat and concave has been used; but these do not hold or retain the shot or ball. On the contrary, it is scattered about laterally in all directions. In fact, the concave form is actually dangerous, often throwing the lead backward.

The recoil projection or pin is important in several particulars. In the first place, it can be made adjustable, if desired, so as to make the contact perfect between the mouth of the chamber in the revolving breech and the rear end of the barrel; secondly, it is much easier to construct and adjust the joints perfectly, requiring less accurate workmanship, in consequence of the bearing-surfaces being so much reduced, for it will be seen that the least irregularity in the set of the pin *a*, or unevenness in the surfaces of the shield-plate *b* and breech-chambers, would prevent the possibility of forming a good joint with the end of the barrel. Now, by the improvement a certain amount of play may be allowed on the pin or axis *a*, while no particular accuracy is required of the surface of either the shield-plate *b* or inner end of the barrel or battery-plate *c* to make the arm work satisfactorily.

What I claim therefore as the improvement of JAMES WARNER, and for which I desire to secure Letters Patent, is—

1. The employment of a pin or other projection, as described, in the shield or rear frame for receiving recoil of the breech, constructed as herein described, at a point just behind and in rear of the chamber that is on a line with the barrel when in position to be discharged in firing the arm, as and for the purposes above set forth.

2. Making the pin or projection *e* adjustable, substantially as and for the purposes set forth.

3. The cavities *i i'* in the battery-plate *c*, in such position and of such form as to receive and hold the ball or balls in case of the accidental discharge of any of the chambers not in adjustment with the barrel, as described.

J. J. GREENOUGH,
*Assignee of James Warner.*

In presence of—
STEPHEN G. CLARKE,
MOSES M. ROBINSON.